US011319997B2

(12) United States Patent
Gao

(10) Patent No.: US 11,319,997 B2
(45) Date of Patent: May 3, 2022

(54) FLEXIBLE SHOCK-ABSORBING PARTS AND FLEXIBLE DAMPING DEVICE

(71) Applicant: DALU Robotech, Technology (Beijing) Co., Ltd., Beijing (CN)

(72) Inventor: Yuan Gao, Beijing (CN)

(73) Assignee: DALU ROBOTECH, TECHNOLOGY (BEIJING) CO., LTD., Beijing (CN)

( * ) Notice: Subject to any disclaimer, the term of this patent is extended or adjusted under 35 U.S.C. 154(b) by 172 days.

(21) Appl. No.: 16/611,392

(22) PCT Filed: Jul. 17, 2018

(86) PCT No.: PCT/CN2018/095951
§ 371 (c)(1),
(2) Date: Mar. 24, 2020

(87) PCT Pub. No.: WO2019/015579
PCT Pub. Date: Jan. 24, 2019

(65) Prior Publication Data
US 2020/0224728 A1    Jul. 16, 2020

(30) Foreign Application Priority Data

Jul. 19, 2017   (CN) .......................... 201710591325.5
May 9, 2018    (CN) .......................... 201820684039.3

(51) Int. Cl.
*F16D 3/12*    (2006.01)
*B62D 5/04*    (2006.01)
*F16F 15/124*  (2006.01)

(52) U.S. Cl.
CPC ............. *F16D 3/12* (2013.01); *B62D 5/0403* (2013.01); *B62D 5/0418* (2013.01); *F16F 15/1245* (2013.01)

(58) Field of Classification Search
CPC .......... F16D 3/12; F16D 3/78; F16F 15/1245; B62D 5/0403; B62D 5/0418
(Continued)

(56) References Cited

U.S. PATENT DOCUMENTS 4,172,369 A * 10/1979 Hayes ....................... F16D 3/78
                                                            464/73
4,228,664 A * 10/1980 McCoy ..................... F16D 1/08
                                                            464/92
(Continued)

FOREIGN PATENT DOCUMENTS

CN    203202059 U  *  9/2013
CN    203641308 U     6/2014
(Continued)

*Primary Examiner* — Tony H Winner
(74) *Attorney, Agent, or Firm* — Muncy, Geissler, Olds & Lowe, P.C.

(57) ABSTRACT

A flexible shock-absorbing parts, suitable for use in a flexible damping device which connects and absorbs torque from two different mechanical shafts, so that they are coaxial during transmission. The flexible shock-absorbing parts is arranged between the two machines and closely attached to them; the flexible shock-absorbing parts are arranged radially on the first plane. The first plane is composed of the X-axis and the Y-axis in the Cartesian coordinate system. When the flexible shock-absorbing parts are installed in the vehicle, it allows the vehicle to absorb larger instantaneous external forces received by the wheels when the vehicle is travelling so that the impact of these external forces on the structure of the motor and the second gear inside the gear box can be reduced, thereby achieving protection for them.

9 Claims, 6 Drawing Sheets

(58) Field of Classification Search
USPC .......................................... 180/408, 412, 6.5
See application file for complete search history.

(56) References Cited

U.S. PATENT DOCUMENTS

| | | | | |
|---|---|---|---|---|
| 5,573,460 | A | 11/1996 | Toji | |
| 6,068,555 | A * | 5/2000 | Andra | F16D 3/50 464/93 |
| 8,992,334 | B2 * | 3/2015 | Sato | F16D 3/74 464/73 |
| 9,937,949 | B2 * | 4/2018 | Kikuchi | B62D 5/0409 |
| 2005/0159225 | A1 * | 7/2005 | Gilbert | F16D 3/78 464/93 |
| 2011/0319176 | A1 * | 12/2011 | Rothe | F16F 15/1245 464/71 |
| 2012/0208649 | A1 * | 8/2012 | Nakagawa | F16D 3/68 464/73 |
| 2014/0155180 | A1 * | 6/2014 | Leonard | F16D 3/80 464/81 |
| 2015/0298733 | A1 * | 10/2015 | Moriyama | F16H 1/16 180/444 |

FOREIGN PATENT DOCUMENTS

| | | |
|---|---|---|
| CN | 204716799 U | 10/2015 |
| CN | 107399360 A | 11/2017 |
| JP | 2013160241 A | 8/2013 |

* cited by examiner

FLEXIBLE SHOCK-ABSORBING PARTS AND FLEXIBLE DAMPING DEVICE

CROSS-REFERENCE TO RELATED APPLICATION

This application claims priority to China Patent Application No. 201710591325.5, filed on Jul. 19, 2017, the contents of which are hereby incorporated by reference to their entirety.

FIELD OF THE INVENTION

The present invention involves a flexible damping device, particularly for a chassis of a traveling device, which can mitigate the external force impacting on the traveling mechanical wheels and their internal components.

BACKGROUND OF THE INVENTION

For a general vehicle, in order to implement steering, a steering gear is required at the vicinity of the wheel to enable the vehicle to turn smoothly. However, the general steering gears are mostly rigid connections. If the tires hit a pothole in the ground while traveling, the tires will instantaneously produce a side angle with respect to the centre-line of the wheel. The side angle not only hinders the travel of the vehicle, but the instantaneous force generated by the tires on hitting the pothole on the ground will also be transmitted to the steering gear. Since most vehicles do not have protecting devices installed on the steering gear to withstand these instantaneous forces and these instantaneous forces can cause damages to the steering gear and the steering gear can easily wear out over time.

The following details explain how these instantaneous forces can cause damages to the steering gear. In conventional vehicles, the wheels are connected to a gear box and the gear box is then connected to the steering gear. A plurality of gears is attached to the gear box and the gears are engaged with each other. Or dual gears are arranged in the direction of the rotation of the gear-shaft. If the plurality of shafts is coaxial, then once the gear box receives these instantaneous forces from the wheels, the plurality of stacked gears will no longer rotate "coaxially". In order to enable the plurality of stacked gears to rotate coaxially under the influences of these instantaneous forces, a coaxial device is used among the plurality of stacked gears in the gear box so that a plurality of stacked gears can be rotated coaxially under the impact of these instantaneous external forces.

Typically, such a coaxial device is fixed between two transmission shafts of two machines (e.g., two gears) that need to be coaxial. In these two machines, the shaft of the first machine is connected to the other shaft of the other machine through a coaxial device to calibrate these two shafts. This type of coaxial device has the following designs: one of the designs is to use a coaxial device consisting of flexible part, an external joint, a pin, a nut, an inner joint, a ring, a ring nut and an anti-friction bushing. The flexible part is used as flexible rotating component for the coaxial device and the flexible part is fixed around each of the parallel shafts of the specific inner and outer coupling portions to form an effective and reliable flexible connection. By absorbing unequal torque and directions from two shafts, these two shafts can be coaxial. However, such a coaxial device has a complicated structure and includes a plurality of shaft joints, pin shafts, and nut fittings, which makes the production difficult; also many accessories may cause the weight of the coaxial device itself very heavy, which makes the installation more difficult. Consequently the transmission effect of the shaft becomes inefficient and the design extremely inconvenient to use.

In addition, there is also a design that uses a coaxial device composing a first semi-coaxial, a second semi-coaxial, a positioning sleeve and an elastomer. The symmetrical design of a first semi-coaxial and a second semi-coaxial is applied and the elastomer is mounted between these two semi-coaxial devices during use. These two semi-coaxial devices are connected by screws and the positioning sleeve is installed to protect and form the entire coaxial device. Although this design is easy to disassemble the two semi-coaxial devices for easy replacement of the elastomer, the coaxial device has too many components, screw holes and screws, and does not constitute an integrated coaxial device. The cost of manufacturing this coaxial device is extremely high and the manufacturing process of this coaxial device is extremely high, and its production is very inconvenient. In addition, when the elastomer is placed in the sealed space formed by the first semi-coaxial device and the second semi-coaxial device, the elastomer deteriorates easily so that it needs to be replaced very often and is too wasteful.

In addition, vehicles typically travel on relatively flat roads so they receive fewer external impacts and have less impact loads. However, for modern high-precision mechanical equipment, such as wheeled robots or special vehicles, due to the complexity of their travelling environment, their internal steering gears will receive more external impacts than the steering gears of the vehicles and cause damages easily.

OBJECT OF THE INVENTION

Given the disadvantages of the previous invention, the present one is a flexible damping device which provides a flexible shock-absorbing parts for connecting with two different mechanical shafts and absorbing torque so that the two machines can be coaxial during the rotating/transmission process. The flexible shock-absorbing parts is placed between the two machines and is attached to them. When the flexible shock-absorbing parts is installed in the vehicle, it allows the vehicle to absorb any instantaneous external force received by the wheels while travelling so that the impact of the external forces on the structure of the motor and the second gear inside the gear box can be reduced, thereby protecting these flexible shock-absorbing parts.

SUMMARY OF THE INVENTION

In summary, in order to improve the defects mentioned in the prior technology, the present invention provides a flexible damping device comprising of a plurality of flexible shock-absorbing parts, a plurality of gears and a transmission shaft.

The structure of this flexible shock-absorbing parts is very simple and easy to make, replace and maintain; an integrated design can also reduce the weight for the other parts in the flexible damping pieces. Also, it does not require a lot of screws and nuts so the cost of manufacturing can be greatly reduced, and is very convenient to use.

This present invention provides a plurality of flexible shock-absorbing parts for connecting with two shafts in two machines and for absorbing their torque and the two machines is coaxial-running. The flexible shock-absorbing parts are placed between the two machines and also attached to them, and they are arranged radially, on the first plane formed by the X-axis and the Y-axis in the Cartesian coordinate system.

The material of the flexible shock-absorbing parts can be metal or polymer, including steel, synthetic rubber and polyurethane. Preferably, the material selected for these flexible shock-absorbing parts is spring steel plates.

Preferably, the number of the flexible shock-absorbing parts is more than 1 and the flexible shock-absorbing parts are distributed peripherally over the shaft. When the number of the flexible shock-absorbing parts is an even number, each two pairs should be symmetrically distributed. When the number of the flexible shock-absorbing parts is an odd number, the angles between the two flexible shock-absorbing parts should be equally distributed.

In the present invention, the coupling and the flexible shock-absorbing parts are applied. When the flexible shock-absorbing parts are impacted and shocked by the external force, these flexible shock-absorbing parts will be deformed to absorb the impacts caused by the external forces so the impacts on the structure of the motor and the gears from the external forces can be reduced and the protection from these flexible shock absorbing parts is realized. When the external forces disappear, the deformation of the flexible shock absorbing parts is restored so the wheel can return to its initial state to ensure the normal operation of the wheel.

The present invention also provides a flexible damping device, which is composed of a plurality of flexible shock-absorbing parts as described above. It is used for a chassis of a vehicle. The flexible damping device is connected to a motor and a wheel base of the chassis. The features of the flexible damping pieces are as follows: a coupling, a first gear, an upper shaft, a second gear, a plurality of flexible shock-absorbing parts and a lower shaft. Wherein one end of the coupling is connected to the motor and the other end of the coupling is attached to the second gear; the second gear is engaged with the first gear, the first gear drives the upper shaft to rotate along with an upper axis; the flexible shock-absorbing parts arranged between the upper shaft and the lower shaft; both the lower shaft and the upper shaft rotate along with the second axis, with the lower shaft connected to the wheel base itself attached to a set of wheels. The wheels of the vehicle moves toward a first direction when the vehicle travelling; when the external force from a second direction is above zero, the flexible shock-absorbing parts will be in a receiving-force state, so they can absorb the external force and ensure that the upper axis and the lower axis are concurrent in the first plane, wherein the first direction is composed of the Y-axis in the Cartesian coordinate system, and the second direction is composed of the X-axis in the Cartesian coordinate system.

Preferably, the flexible shock-absorbing parts are in an initial state when the wheel is subjected to another external force from the second direction.

Preferably, in the initial state, the projected pattern of the flexible shock-absorbing parts on the first plane is the first pattern.

Preferably, in the receiving-force state, the projection pattern of the flexible shock-absorbing parts on the first plane is the second pattern.

Preferably, the first pattern is composed of a plurality of rectangles and the second pattern is composed of a plurality of polygons.

Preferably, wherein the flexible shock-absorbing parts is arranged in a gear box of the travelling device.

The flexible damping device provided by this invention can absorb the large instantaneous external force received by the wheel and reduce the impact of the external force on the structure of the motor and the second gear inside the gear box during the travel of the device in order to protect these flexible shock-absorbing parts. When the external force disappears, the deformation of the flexible shock-absorbing are restored so that the wheel can return to its initial state to ensure the normal operation of the travelling vehicle.

DETAILED DESCRIPTION

To make the objects, technical features and advantages of this present invention easy to understand for those skilled engineers and easy to implement, a description of the progress of the preferred embodiments would be stated below. The drawings referred to hereinafter are intended to be illustrations of the features of the present invention and are not necessarily required to be fully drawn according to the actual situation. If the description of the embodiments of this present invention relates to technical contents which are well known to skilled engineers, they will not be described.

Figure 1:
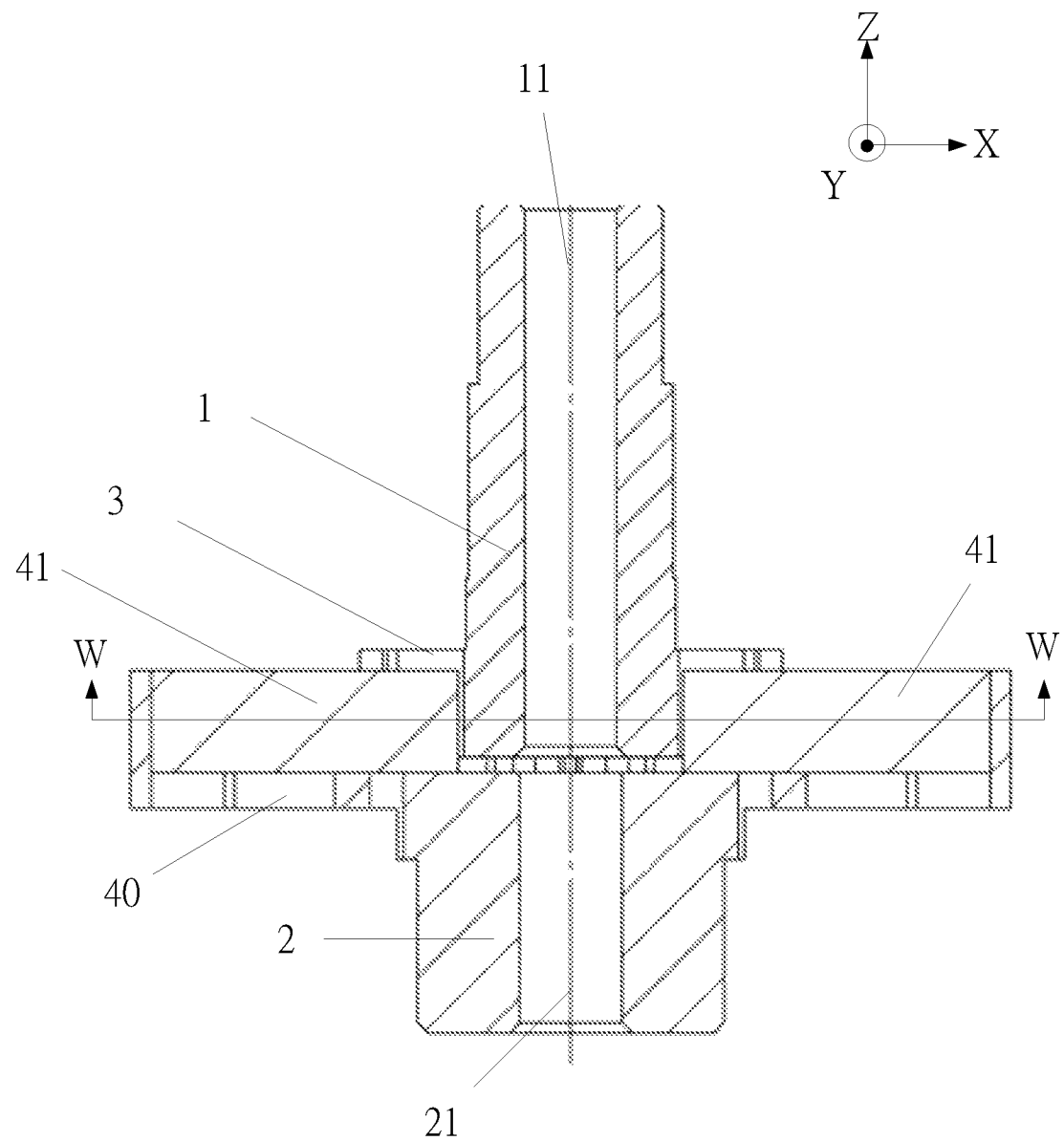
FIG. 1 shows a side view of one embodiment of the flexible shock-absorbing parts in accordance with the present invention.

Please refer to FIG. 1. FIG. 1 is a cross-sectional view of one embodiment of the disclosed technology in accordance with the present invention. The flexible shock-absorbing parts 41 of FIG. 1 are connected to two different shafts of the machines, so as to the two different shafts of the machines is rated coaxially during transmission. The term "coaxial" used here means: the projection line of the rotation axis for two different machines, which are the upper shaft and the lower shaft on the third plane, is a straight line as shown on FIG. 1. It is noted to illustrate that the first plane is composed of the X-axis and the Y-axis, the second plane is composed of the Y-axis and Z-axis and the third plane is composed of the X-axis and the Z-axis in the Cartesian coordinate system in entire the specification of this present invention. The two machines rotate by the axes of the upper shaft 1 and the lower shaft 2. In the embodiment of the present invention, the axis of the upper shaft 1 is called the first axis 11 and the axis of the lower shaft 2 is called the second axis 21. The upper shaft 1 is connected to the power supply device (not shown in FIG. 1). The power supply device drives the upper shaft 1 to rotate. Then the upper shaft 1 and the lower shaft 2 are connected by the flexible shock-absorbing parts 41. As the upper shaft is rotating, a torque is generated, and the torque is transmitted to the gearing wheel 40 and the lower shaft 2 through the flexible shock-absorbing parts 41. After the lower shaft 2 receives the torque, it drives the device attached to the lower shaft 2 to rotate. The device attached to the lower shaft mentioned above can be any device that can be driven by the steering lower shaft 2, such as a gear or a wheel in a travelling device. If the torque is transmitted without any loss of energy, the lower shaft 2 and the upper shaft 1 will rotate with the same axis, in the same direction and with the same speed, and then the lower shaft 2 drives the device attached to the lower shaft 2 to rotate in order to complete the transmission process. It should be noted that "same direction of rotation" means that when the upper shaft 1 and the lower shaft 2 are rotating, the direction of their torque is the same. The two machines described in all embodiments of the present invention may be gears or mechanical devices with two parallel or coaxial shafts. In the present embodiment, the two machines are the first machine, which includes the upper shaft and a first gear 3 and the second machine 40 which includes a gearing wheel 40 and the lower shaft 2. The first gear 3 is attached with the upper shaft 1 and the gearing wheel 40 is attached with the lower shaft 2. In other embodiments, these two machines may also include one or more rotating components, which are not limited in the present invention. In addition, the flexible shock-absorbing parts 41 may be a plate. The center of the sheet can be cut off so the hollow portion of the flexible shock-absorbing parts 41 can be fixed to the shaft. The distribution of the hollow portion (not shown in FIG. 1) of the plate and the diameter are not necessarily uniform. They can be uneven diameters in order to match with the upper shaft 1 and the lower shaft 2. The changing ranges and sizes of the diameters of the hollow portions are not limited by the claims of the present invention.

In the present invention, the purpose of providing the flexible shock-absorbing parts 41 for connecting the upper shaft 1 and the lower shaft 2 is that if the first axis 11 and the second axis 21 of two shafts (the upper shaft 1 and the lower shaft 2) are not rotated coaxially during the transmission process, the flexible shock-absorbing parts 41 can restore the coaxial rotation of the first axis 11 and second axis 21 from the non-coaxial rotation to smoothly perform the transmission process. At the same time, the flexible shock-absorbing parts 41 can partially absorb the external torque that is transmitted from the lower shaft 2 to the upper shaft 1 so the first machine can be protected.

Figure 2:
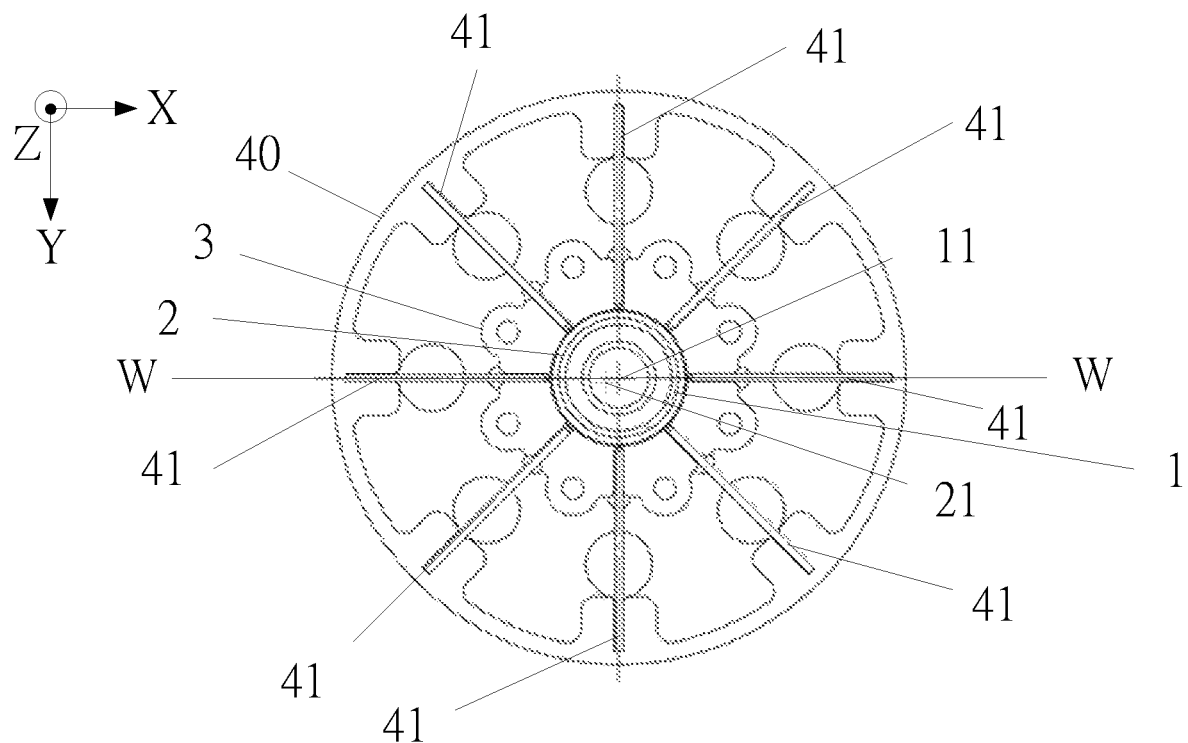
FIG. 2 shows a top view of one embodiment of the flexible shock-absorbing parts in accordance with the present invention.

Please continue referring to FIG. 2. FIG. 2 is a cross-sectional view on the first plane along the W-W Line in FIG. 1, showing one embodiment of the installation and connection relationship of the flexible shock-absorbing parts 41. In the present embodiment, the flexible shock-absorbing parts 41 is arranged in radial style using the axis of the first axis 11 as a reference point so these flexible shock-absorbing parts 41 forms a sun-like shape surface on the first plane. The material of the flexible shock-absorbing parts 41 is generally selected from the kind that possess a good pliability, such as a metal plate, a hard rubber plate, a polyurethane block, etc. Preferably, the material of the flexible shock-absorbing parts 41 is spring steel plate. These materials will deform if they receive the external force, but after the external force disappears, these materials may return to their original shape or remain their deforming shapes. In a specific embodiment, applying 8 parts of the flexible shock-absorbing parts 41 and using the first axis 1 as a point of symmetry configures a point-symmetric arrangement on the first plane. In other embodiments of the present invention, the number of flexible shock-absorbing parts 41 may be 6, 4 or 2 (in even numbers). In another embodiment of the present invention, the number of flexible shock-absorbing parts 41 may be an odd number. However, applying the even number of the flexible shock-absorbing parts 41 is the best implementation. Viewed from the third direction, the first gear 3 is configured above these flexible shock-absorbing parts 41. In the present embodiment, the shape of the first gear 3 is designed to conform to the shape of the flexible shock-absorbing parts 41. This means the first gear 3 shields the position of the flexible shock-absorbing parts 41 and the first gear 3 has an opening to expose the flexible shock-absorbing parts 41; therefore, when the flexible shock-absorbing parts 41 are viewed from the third direction, they are exposed to the first gear 3.

Figure 3:
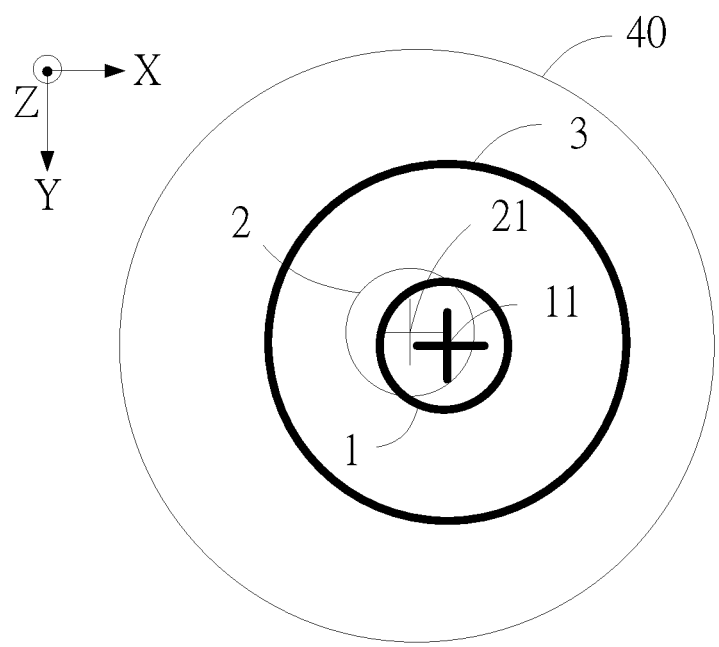
FIG. 3 shows a plane view of the axis arrangement for the two machines while the flexible shock-absorbing parts in an initial state in accordance with the disclosed technology of the present invention.

FIG. 1 and FIG. 2 show the details each part of the flexible shock-absorbing parts 41 and their configuration. They also shows the connection with other devices when the flexible shock-absorbing parts 41 is at rest. Later, we will describe the shock-absorbing parts 41 at the time of use. Please refer to FIG. 3. FIG. 3 is a plane view showing the arrangement of the axes for the two machines while the flexible shock-absorbing parts-41 in an initial state in accordance with the disclosed technology of the present invention. FIG. 3 is a simplified view that only shows parts such as the upper shaft 1, the second gear 80, the first axis 11, the lower shaft 2, the second machine 40 and the lower shaft 2, etc. In FIG. 3, while in the initial state, which means if the lower shaft 2 and the second machine 40 receive an external force of zero, the upper shaft 1 and the lower shaft 2 are rotated in a coaxial manner and the projection point of the first axis 11 of the upper shaft 1 and the second axis 21 of the lower shaft is the same point on the first plane. However, if the lower shaft 2 and the second machine 40 receive the external force above zero, the projection point on the first axis 11 of the upper shaft 1 and the second axis 21 of the lower shaft is not on the same point on the first plane. Both machines may undergo external impacts or their own vibration so the two machines will not rotate coaxially. If both machines do not rotate as such, then the rotating efficiency would be very poor. This means the energy of the first gear 3 cannot be completely transmitted to the gearing wheel 40 and it results in energy loss and waste. In order to allow both machines to rotate coaxially, the flexible shock-absorbing parts 41 need to be installed between the upper shaft 1 and the lower shaft 2, as shown in FIG. 1 and FIG. 2, in order to make these both machines rotate on the same axis, so the issue of not rotating with the same axis can be avoided. In addition, as the gearing wheel 40 receives the external torque from different positions and directions, it may drive the lower shaft to generate the external torque. If this external torque is transmitted to the first machine through the upper shaft 1, which is connected to the lower shaft 2, the first machine may be damaged. The flexible shock-absorbing parts 41 can partially absorb the external torque that is transmitted to the upper shaft 1 by the lower shaft 2 and so provide protection for the first machine.

Figure 4:
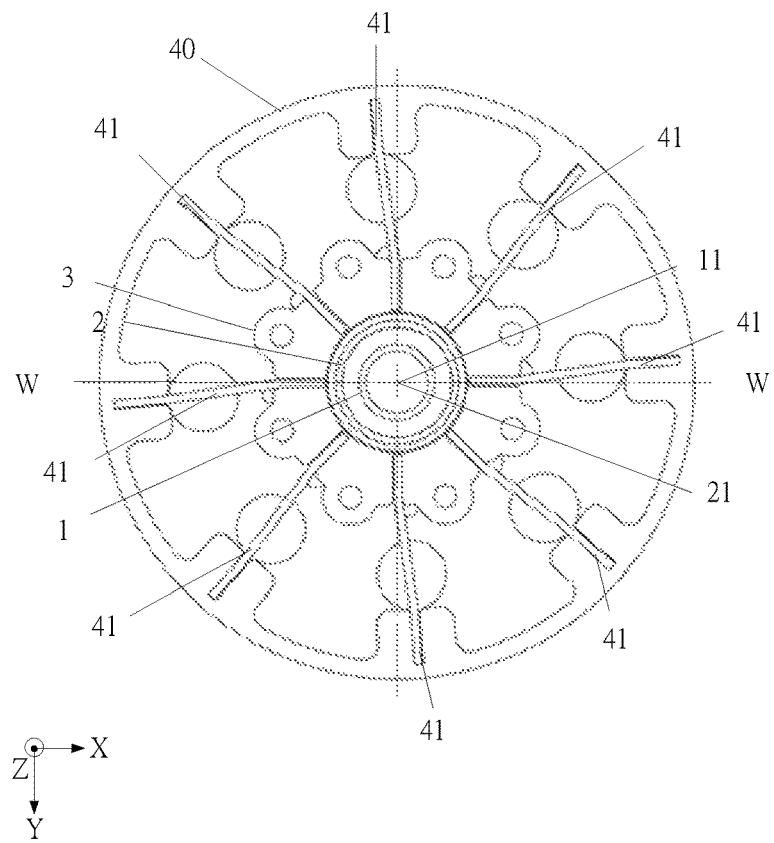
FIG. 4 is a plane view showing the composition of a flexible shock-absorbing parts under a stress condition in accordance with the disclosed technology of the present invention.

While in the operating state, the condition of the flexible shock-absorbing parts 41 is shown in FIG. 4. FIG. 4 shows a cross-sectional view on the first plane along the W-W Line in FIG. 1. FIG. 4 shows the composition of the flexible shock-absorbing parts 41, in the state of receiving force, according to the technology disclosed in the present invention. FIG. 4 is a plane view on the first plane from the section W-W in FIG. 1. When the upper shaft 1 and the first gear 3 receive the external force above zero, this external force is transmitted to the flexible shock-absorbing parts 41 and this external force causes an additional torque. In the initial state, the flexible shock-absorbing parts 41 are rotated according to the rotation of the first gear 3 and the gearing wheel 40. Therefore, the rotation axis of the first gear 3 and the gearing wheel 40, will share the same rotation speed, the force and direction. This means the common center of mass of the plurality of flexible shock-absorbing parts 41 is the same with the first gear 3 and the first gearing wheel 40. When the second machine 40 receives an external force during the rotation, the external force and the torque generated by this force are transmitted to the flexible shock-absorbing parts 41. When the flexible shock-absorbing parts 41 receive an external force, the flexible shock-absorbing parts 41 instantaneously generate a displacement relative to the upper shaft 1. This means the flexible shock-absorbing parts 41 are twisted and deformed. If the additional torque combined with the rotation torque generated originally by the upper shaft 1 and the first gear 3 exceeds the maximum torque that the flexible shock-absorbing parts 41 can withstand, then the flexible shock-absorbing parts 41 will be deformed and damaged. Therefore, designing the maximum torque that these flexible shock-absorbing parts 41 can withstand is a key point for the present invention. The maximum torque that the flexible shock-absorbing parts 41 can withstand is based on the number, size, and material of the flexible shock-absorbing parts 41, which is not limited by the present invention. In one embodiment, the flexible shock-absorbing parts 41 can withstand a maximum torque of 40 to 70 N-m. In addition, since the details of each flexible shock-absorbing part 41 is different, the situation of deformation and distortion of each flexible shock-absorbing parts 41 is different. In the initial state, the projected pattern of the flexible shock-absorbing parts 41 on the first plane is the first pattern. However, in the receiving-force (or stressed) state, the projected pattern of the flexible shock-absorbing parts 41 on the first plane is the second pattern. The design of the first pattern and the second pattern may be the same or different. The first pattern is composed of a plurality of rectangles, and the second pattern is composed of a plurality of polygons. The polygon may be a plurality of triangles, a plurality of quadrangles, or a combination of a plurality of diamonds.

When the flexible shock-absorbing parts 41 is deformed, the first gear 3 and the gearing wheel 40 rotate coaxially. The flexible shock-absorbing parts 41 also rotate coaxially with the first gear 3 in the form of the deformed flexible shock-absorbing parts 41. And this additional torque is absorbed by the flexible shock-absorbing parts 41 and this additional torque is not transmitted to the upper shaft 1. After the external force disappears, the flexible shock-absorbing parts 41 return to the same shape as before the deformation. In another embodiment, after the first gear 3 and the second machine 40 rotate coaxially, the center of mass of the flexible shock-absorbing parts 41 returns to its original center of mass. This means the center of mass of the first gear 3 and the center of mass of the gearing wheel 40 are the same. Therefore, the deformation of the flexible shock-absorbing parts 41 disappears, and the first pattern is restored from the second pattern. The flexible shock-absorbing parts 41 provided by the above embodiment are not only simple in structure, but also do not require complicated fittings such as pin shafts and nuts. The flexible shock-absorbing parts 41 are light in weight and extremely convenient for manufacturing. Moreover, the flexible shock-absorbing parts 41 are not easily deteriorated, so that it is not necessary to replace the elastomer very often and is very convenient to use.

Figure 5:
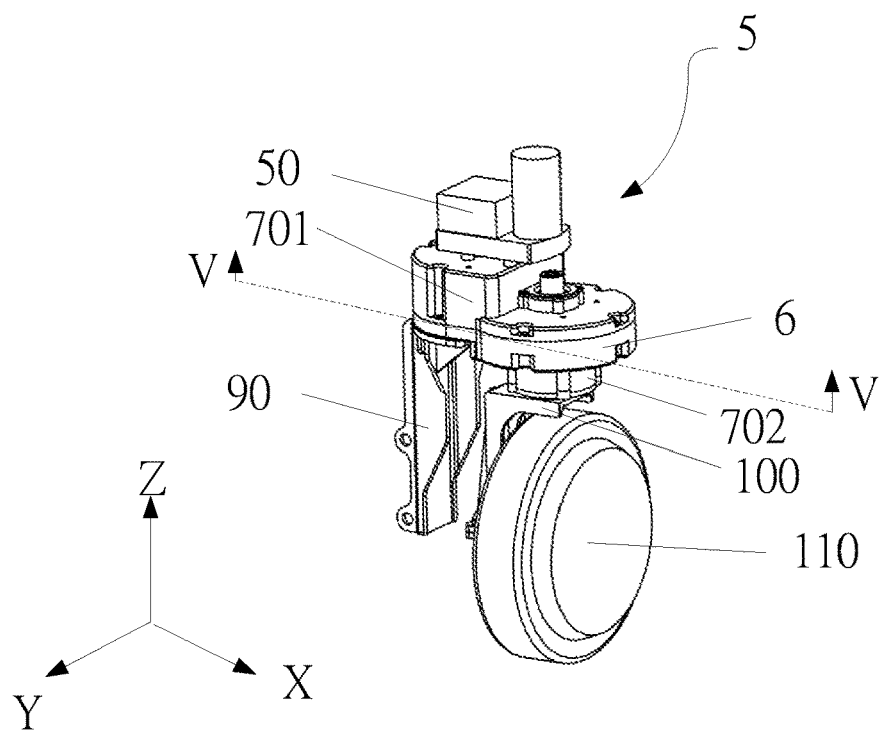
FIG. 5 is a side view showing the flexible damping device in accordance with the disclosed technology of the present invention.

Next, please refer to FIG. 5, which is a side view showing the flexible damping device in accordance with the disclosed technology of the present invention. The flexible damping device 6 is another embodiment of the present invention. In this embodiment, the flexible damping device 6 is fixed in a gear box of the wheel part 5 of the travelling vehicle. This travelling vehicle includes mobile wheeled equipment such as special vehicles, wheeled robots, or spacecraft and aircraft, etc. In FIG. 5, the gear box is formed by the shell of the gear box 70 covering various gear components, the shaft components and the flexible shock-absorbing parts 41. The material of the gear box 70 is primarily constructed of metal, such as iron or aluminum, to provide substantial protection to the internal components of the gear box. The first ends of the flexible damping device 6 is connected to the motor 50 and the second ends of the flexible damping device 6 is connected to the wheel base 100. The wheels 110 are fixed on the wheel base 100. The wheel part 5 is connected to the steer base 90. Through this steer base 90, the shell of the gear box can be installed on the chassis of the travelling vehicle. The motor 50 is a machine that controls the wheels 110 and the turning direction of the travelling vehicle. Inside of the motor, it has a plurality of gears that output torque for rotating other machines. In the present embodiment, only one set of wheel part 5 is illustrated. It is to be understood that the general travelling vehicle is composed of four wheels and thus the travelling vehicle travelling device has 4 sets of wheel part 5. In some cases, it also has 6 sets, 8 sets and so on.

Figure 6:
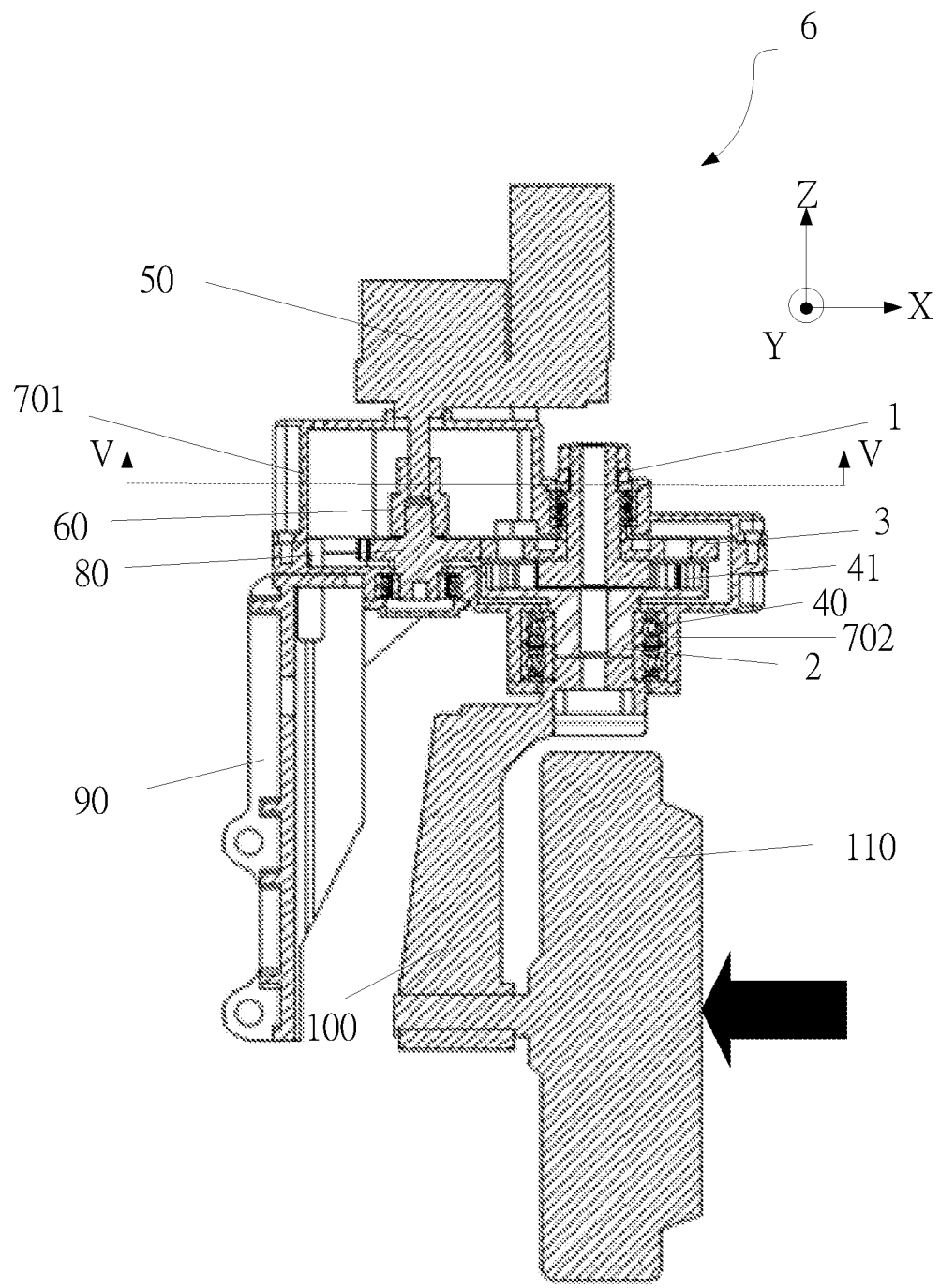
FIG. 6 is a side view of the internal composition of the flexible damping device in accordance with the disclosed technology of the present invention.

Next, please refer to FIG. 6. FIG. 6 is a cross-sectional view showing the internal composition of the flexible damping device according to another embodiment of the disclosed technology of the present invention. The flexible damping device 6 includes a coupling 60, a second gear 80, an upper shaft 1, a first gear 3, flexible shock-absorbing parts 41 and a lower shaft 2. It also shows one end of the coupling 60 is connected to the motor 50 and the other end of the coupling 60 connected to the second gear 80. The coupling 60 enables the motor 50 and the second gear 80 to rotate with the same axis and ensures that the torque of the motor 50 can be transferred to the second gear 80 without any loss. The second gear 80 is located in the upper shell of gear box 701 to mesh with the first gear 3 and the second gear 80 transmits the power supply from the motor 50 to the first gear 3. In this embodiment, the first gear 3 is a gear set that has a plurality of gears. The implementer can freely adjust the diameter of the gears of the first gear 3 to match with the second gear 80 in order to reduce the rotational speed and increase the torque, or to increase the rotation speed and reduce the torque. The present invention does not limit the number of gears configured in the first gear 3 and the distance between the gears. The first gear 3 drives the upper shaft 1 to rotate with the first axis 11. The flexible shock-absorbing part 41 is interposed between the upper shaft 1 and the lower shaft 2. The lower shaft 2 linked to the upper shaft 1 rotate with the second axis 21. The lower shaft 2 transmits the torque to the wheels 110 by the wheel base 100 so that the wheels 110 can rotate. The wheel base 100 and the wheels 110 are embodiments of the second machine 40 described above. The wheel base 100 is also attached with a plurality of gears to shift the direction of the torque and transmit it to the wheels 110 for rotating the wheels 110. When the wheels 110 rotate, the direction of the torque is perpendicular to the upper shaft 1 and the lower half shaft 2. When an external force is applied to the wheels 110 (as indicated by the black arrow in FIG. 6), the wheels 110 and the wheel base 100 are bent and shifted toward the direction of the force and the lower shaft 2 is bent as well; therefore, the second axis 21 is shifted from the first axis 11 so the two axis are not coaxial. If non-coaxially condition occurs inside the travelling vehicle, the internal gear parts can be worn out, the abnormalities of the motor 50 may occur and furthermore, the travelling vehicle itself may be out of control. The flexible damping device 6 is configured in the travelling vehicle. By absorbing the external force, the flexible shock-absorbing parts 41 allow the lower half shaft 2 and the upper shaft 1 inside the gear box to rotate coaxially, so the travelling vehicle can operate smoothly. At the same time, as the wheels 110 is subjected to different angles and positions of the torque, a part of the torque is converted into an external force torque toward the lower shaft 2. The flexible shock-absorbing parts 41 can partially absorb the external torque mentioned above so the external torque transmitted to the upper shaft 1 is reduced and the second gear 80 and the motor 50 are protected. In the present embodiment, whether the flexible damping device 6 is in the initial state or in the receiving-force state, the embodiments of the present invention, the flexible shock-absorbing parts 41, are the same, so they will not be described again herein.

Figure 7:
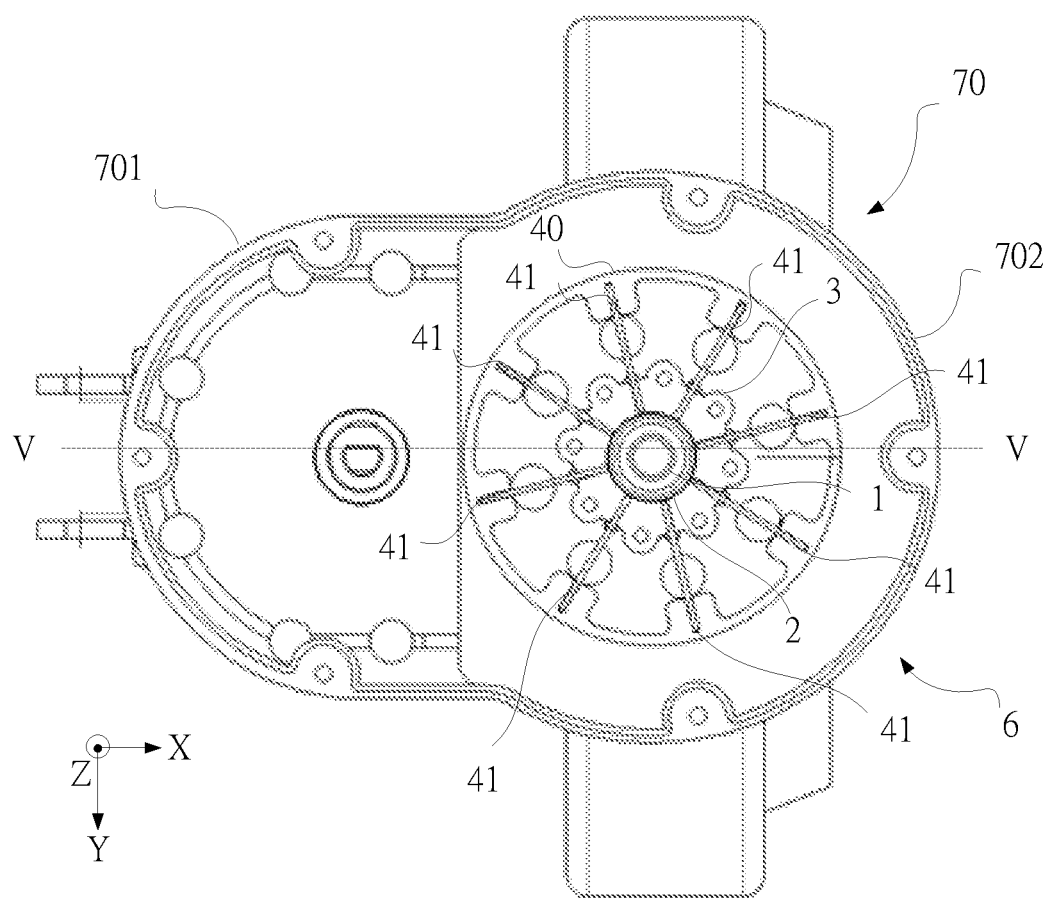
FIG. 7 is a plane view of the flexible damping device in accordance with the disclosed technology of the present invention.

Please refer to FIG. 7. FIG. 7 is a plane view showing the flexible damping device 6 according to another embodiment of the disclosed technology of the present invention. FIG. 7 is a plane view of the first plane from the section V-V in FIG. 6. As shown in FIG. 7, the axis of the flexible shock-absorbing parts 41 is the first axis 11 and the shaft is configured in the upper shaft. The flexible shock-absorbing parts 41 are installed in the upper shell 720 of the gear box. FIG. 7 only illustrates the configuration of the flexible shock-absorbing parts 41 in the gear box. The functions, the connecting relationships of the flexible shock-absorbing parts 41 in the initial state and in the stressed state are described in the embodiments of the flexible shock-absorbing parts 41 of the present invention; therefore, it will not be described again here.

In one embodiment of the present invention, the upper shaft is connected to the first gear 3 and the lower shaft 2 is connected to the gearing wheel 40. The flexible shock-absorbing parts 41 are fixed between the first gear 3 and the gearing wheel 40. The methods of connecting each part include welding and slot connections. The method of slot connection includes grooving a slot between the first gear 3 and the gearing wheel 40 and then embedding the flexible shock-absorbing parts 41 in the groove, so the first gear 3 and the gearing wheel 40 can be connected.

Figure 8:
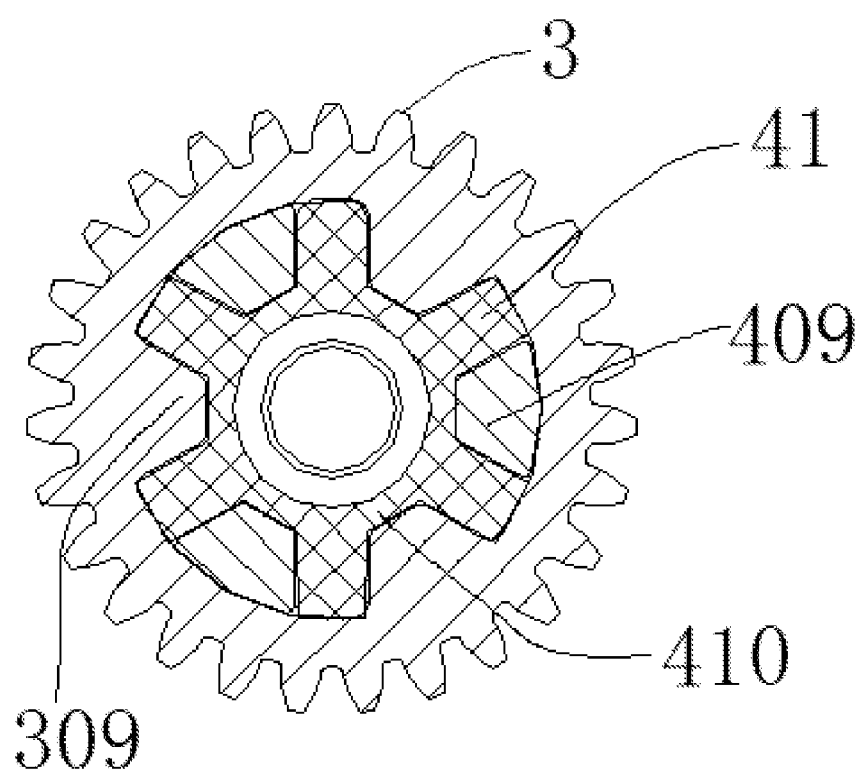
FIG. 8 is schematic diagram of another embodiment of the disclosed technology of the present invention.

Please refer to FIG. 8, which is another embodiment of the present invention. FIG. 8 is an upward or bottom plane view on the first plane from the section W-W in FIG. 1. In the present embodiment, the first machine includes the upper shaft 1 (not shown) and the first gear 3, which are connected. The second machine 40 includes the lower shaft 2. The plurality of flexible shock-absorbing parts 41 are fixed to an annular structure 410 and the plurality of flexible shock-absorbing parts 41 mentioned above are arranged radially and evenly distributed in the circumferential direction of the annular structure 410, forming a sun-like shape on the first plane. A space is left between the adjacent pieces in 41 and the number of flexible damping pieces 41 is equal to the number of spaces mentioned above. The flexible shock-absorbing parts 41 are not fixed to the first gear 3 and the second machine 40. Preferably, the flexible shock-absorbing parts 41 are made from resilient materials, including polyurethane or rubber. The flexible shock-absorbing parts 41 are fixed to the annular structure 410 through press molding or press forming.

One end of the first gear 3, which is connected to the flexible shock-absorbing parts 41 is configured with at least one first protrusions 309. The shape of the first protrusions 309 is consistent with the space between two adjacent flexible shock-absorbing parts 41. One end of the lower half shaft 2 connected with the flexible shock-absorbing parts 41 is configured with at least one second protrusions 409. The shape of the second protrusions 409 is consistent with the space between the two adjacent flexible shock-absorbing parts 41. The sum of the number of the first protrusions 309 and the number of the second protrusions 409 shall not exceed the number of the flexible shock-absorbing parts 41. Between the position of the first protrusions 309 and the position of the second protrusions 409 is left a space for the position of the flexible shock-absorbing parts 41. In FIG. 8, there are six flexible shock-absorbing parts 41 and the number of spaces between adjacent flexible shock-absorbing parts 41 is six so the number of the second protrusions 409 is three and the number of the first protrusions 309 is also three.

The first gear 3 is connected to the flexible shock-absorbing parts 41 through the first protrusions 309 and the flexible shock-absorbing parts 41 are connected to the second protrusions 409 of the lower shaft 2. According to the aforementioned, the plurality of flexible shock-absorbing parts 41 is fixed closely between the first protrusions 309 and the second protrusions 409, so the torque can be transmitted between the upper shaft 1 and the lower shaft 2. When an external torque is applied to the lower shaft 2, the flexible shock-absorbing parts 41 can absorb the external force through their own deformation, so the first machine can be protected. The flexible shock-absorbing parts 41 provided by the present invention can absorb the large instantaneous external force received by the wheels 110 during the travel running of the vehicle, in order reduce the external force on the structure of the motor 50 and the second gear 80 inside the gear box and so protect these components. When the external force disappears, the deformation of the flexible shock-absorbing parts 41 is restored (and may not be restored) so the wheels 110 can return to their initial state to ensure the normal operation of the wheels 110 and driving safety.

The embodiment mentioned above is the preferred embodiment of the present invention and is not intended to limit the scope of the present invention. The descriptions mentioned above should be understood and implemented by those skilled in the relevant technology fields. Therefore, the other embodiments are deviated from the spirit, equivalent changes or modifications of the present invention shall be included in the scope of this patent application.

I claim:

1. A flexible damping device, which is composed of a plurality of flexible shock-absorbing parts, is constructed in a chassis of a vehicle and is connected to a motor and a wheel base of the chassis, the flexible damping device is comprising:
a coupling, a first gear, an upper shaft, a second gear, the plurality of flexible shock-absorbing parts, and a lower shaft; wherein one end of the coupling connects to the motor, and another end of the coupling attaches to the second gear, the second gear engages with the first gear, and the first gear drives the upper shaft to rotate along with an upper axis, the flexible shock-absorbing parts are arranged between the upper shaft and the lower shaft; both the lower shaft and the upper shaft rotate along with a second axis, the lower shaft connects to the wheel base and one of wheels fixes on the wheel base;

wherein the flexible shock-absorbing parts, which connect with two shafts in two machines, absorb a torque by making the two machines rotated coaxially, the flexible shock-absorbing parts are arranged between the two machines and tight attached to the two machines, and wherein the configured flexible shock-absorbing parts are radially on a first plane, and the first plane is composed of an X-axis and a Y-axis in a Cartesian coordinate system;

wherein, when the wheels of the running vehicle move towards a first direction, and an external force from a second direction is above zero, the flexible shock-absorbing parts enter into a stressed state, so the flexible shock-absorbing parts can absorb an external force and ensure that the upper axis and the lower axis are concurrent in the first plane, wherein the first direction is composed of the Y-axis in the Cartesian coordinate system, and the second direction is composed of the X-axis in the Cartesian coordinate system.

2. The flexible damping device according to claim 1, wherein a material of the flexible shock-absorbing parts are made of metal or polymer.

3. The flexible damping device according to claim 1, wherein a number of the flexible shock-absorbing parts are more than two, and the flexible shock-absorbing parts are distributed peripherally around the shaft.

4. The flexible damping device according to claim 1, wherein the two machines include a first machine and a second machine, the first machine comprises a first gear, and the second machine comprises a gearing wheel, and the flexible shock-absorbing parts connect with the first gear and the gearing wheel, so that torque generated by the first gear is transferred to the gearing wheel.

5. The flexible damping device according to claim 4, wherein the first machine comprises a first gear and the second machine comprises a lower shaft, the first gear connects the one end of the flexible shock-absorbing parts via the first protrusion, while another end of the flexible shock-absorbing parts connect to the lower shaft via the second protrusion, and the flexible shock-absorbing parts are attached between the first protrusion and the second protrusion, so that torque generated by the first gear is transferred to the gearing wheel.

6. The flexible damping device according to claim 1, wherein the flexible shock-absorbing parts are in an initial state when the wheel is subjected to the external force from the second direction.

7. The flexible damping device according to claim 6, wherein a projected pattern of the flexible shock-absorbing parts on the first plane in the initial state is a first pattern, wherein the first pattern consists of multiple rectangles.

8. The flexible damping device according to claim 1, wherein a projected pattern of the flexible shock-absorbing parts on the first plane in the stressed state is a second pattern, wherein the second pattern consists of a polygon.

9. The flexible damping device according to claim 1, wherein the flexible shock-absorbing parts are installed in a gear box of a mobile vehicle.

\* \* \* \* \*